US012773809B2

(12) United States Patent
Siegl et al.

(10) Patent No.: US 12,773,809 B2
(45) Date of Patent: Oct. 27, 2026

(54) METHOD FOR PRODUCING AN rPET PLASTIC MATERIAL FOR USE IN A THIN WALL INJECTION MOLDING PROCESS AND HOLLOW BODY PRODUCED IN THE THIN WALL INJECTION MOLDING PROCESS

(71) Applicant: ALPLA WERKE ALWIN LEHNER GMBH & CO. KG, Hard (AT)

(72) Inventors: Robert Siegl, Dornbirn (AT); Benjamin Haas, Lauterach (AT)

(73) Assignee: ALPLA WERKE ALWIN LEHNER GMBH & CO., Hard (AT)

( * ) Notice: Subject to any disclaimer, the term of this patent is extended or adjusted under 35 U.S.C. 154(b) by 168 days.

(21) Appl. No.: 18/264,748

(22) PCT Filed: Feb. 8, 2022

(86) PCT No.: PCT/EP2022/052961

§ 371 (c)(1),
(2) Date: Aug. 8, 2023

(87) PCT Pub. No.: WO2022/167679

PCT Pub. Date: Aug. 11, 2022

(65) Prior Publication Data

US 2024/0100742 A1 Mar. 28, 2024

(30) Foreign Application Priority Data

Feb. 8, 2021 (CH) ........................................ 117/21
Dec. 17, 2021 (CH) ................................ 70736/2021

(51) Int. Cl.

| | |
|---|---|
| ***B29B 17/00*** | (2006.01) |
| ***B29B 9/10*** | (2006.01) |
| ***B29B 17/02*** | (2006.01) |
| ***B29C 45/00*** | (2006.01) |
| ***B29D 22/00*** | (2006.01) |
| *B29B 17/04* | (2006.01) |
| *B29K 67/00* | (2006.01) |
| *B29K 105/00* | (2006.01) |
| *B29K 105/26* | (2006.01) |
| *B29L 31/00* | (2006.01) |

(52) U.S. Cl.

CPC ............ *B29B 17/0042* (2013.01); *B29B 9/10* (2013.01); *B29B 17/02* (2013.01); *B29C 45/0001* (2013.01); *B29D 22/003* (2013.01); *B29B 2017/0015* (2013.01); *B29B 2017/0255* (2013.01); *B29B 2017/0268* (2013.01); *B29B 2017/0286* (2013.01); *B29B 17/04* (2013.01); *B29B 2017/042* (2013.01); *B29C 2045/0091* (2013.01); *B29C 2045/0094* (2013.01); *B29K 2067/003* (2013.01); *B29K 2105/0094* (2013.01); *B29K 2105/26* (2013.01); *B29L 2031/7158* (2013.01); *Y02W 30/62* (2015.05)

(58) Field of Classification Search

CPC ...... B29K 2067/003; B29K 2105/0094; B29K 2105/26

See application file for complete search history.

(56) References Cited

U.S. PATENT DOCUMENTS

| | | | | |
|---|---|---|---|---|
| 5,635,584 A * | 6/1997 | Ekart | C08J 11/24 | 528/193 |
| 5,780,128 A | 7/1998 | Farha | | |
| 5,876,644 A * | 3/1999 | Nichols | B29B 17/0026 | 264/141 |
| 7,247,698 B2 * | 7/2007 | Denis | B29B 11/08 | 215/11.1 |
| 8,080,190 B2 * | 12/2011 | Ichikawa | G03G 15/0872 | 264/537 |
| 8,968,849 B2 * | 3/2015 | Scantlebury | C08G 63/183 | 528/308.1 |
| 9,221,971 B2 * | 12/2015 | Tammaji | C08G 63/916 | |
| 11,254,797 B2 * | 2/2022 | Weber | B29B 9/12 | |

(Continued)

FOREIGN PATENT DOCUMENTS

| | | |
|---|---|---|
| EP | 1815960 A1 | 8/2007 |
| EP | 2593494 A1 | 5/2013 |
| JP | 2014198422 A | 10/2014 |

(Continued)

OTHER PUBLICATIONS

Awaja, F. et al. "Recycling of PET" European Polymer Journal, Pergamon Press LTD Oxford, GB, vol. 41, No. 7, Jul. 1, 2005, pp. 1453-1477. (Year: 2005).*

(Continued)

*Primary Examiner* — Benjamin A Schiffman
(74) *Attorney, Agent, or Firm* — Morriss O'Bryant Compagni Cannon, PLLC

(57) ABSTRACT

The invention relates to a method in which a starting material for injection-molding, having a viscosity of between 0.50 and 0.7 dL/g, is produced with the aid of a chain breaker from a recycled post-consumer PET having a viscosity of between 0.72 and 0.86 dL/g according to ASTM D4603 and a copolymer fraction of at most approximately 3%. In the method, the comminuted and dried PET material is melted and decontaminated to such a degree that it is suitable for applications in the food sector and the consumer goods sector. A chain breaker is added to the rPET material in the melt of the recycling extruder and/or preferably the melt of the injection unit in order to lower the viscosity and to enrich the PET with copolymers.

36 Claims, No Drawings

(56) References Cited

U.S. PATENT DOCUMENTS

| | | | | |
|---|---|---|---|---|
| 11,708,473 | B2 * | 7/2023 | Siegl | B29C 49/0005 521/60 |
| 12,343,910 | B2 * | 7/2025 | Siegl | B29B 17/0042 |

FOREIGN PATENT DOCUMENTS

| | | | | | |
|---|---|---|---|---|---|
| WO | 9720886 | A1 | | 6/1997 | |
| WO | 03011549 | A1 | | 2/2003 | |
| WO | 2011088455 | A2 | | 7/2011 | |
| WO | 2018127431 | A1 | | 7/2018 | |
| WO | WO-2018162339 | A1 | * | 9/2018 | C08J 9/06 |

OTHER PUBLICATIONS

Awaaja et al., "Injection stretch blow moulding process of reactive extruded recycled PET and virgin PET blends" European Polymer Journal, Pergamon Press LTD Oxford, GB , vol. 41, No. 11, Nov. 1, 2005, pp. 2614-2634. (Year: 2005).*

International Search Report for International Patent Application No. PCT/EP2022/052961, 3 pages, mailed May 17, 2022.

Written Opinion for International Patent Application No. PCT/EP2022/052961, 6 pages, mailed May 17, 2022.

* cited by examiner

METHOD FOR PRODUCING AN rPET PLASTIC MATERIAL FOR USE IN A THIN WALL INJECTION MOLDING PROCESS AND HOLLOW BODY PRODUCED IN THE THIN WALL INJECTION MOLDING PROCESS

CROSS-REFERENCE TO RELATED APPLICATIONS

This application is a national phase entry under 37 U.S.C. § 371 of PCT/EP2022/052961 filed Feb. 8, 2022, which claims priority to Swiss Patent Application No. 00117/21 filed Feb. 8, 2021 and Swiss Patent Application No. CH070736/2021 filed Dec. 17, 2021, the entirety of each of which is incorporated by this reference.

FIELD OF THE INVENTION

The present invention relates to a method for producing an rPET plastic material for use in a thin-wall injection-molding process, and to a hollow body produced in the thin-wall injection-molding process.

PRIOR ART

The standard PET types used nowadays for the production of bottles in an injection stretch blow molding process are predominantly linear PET types (non-branched) with a low copolymer fraction of less than 5 wt % and an intrinsic viscosity (IV) between 0.72 and 0.86 dL/g (according to ASTM D 4603). During the processing of PET in the one-stage or two-stage injection stretch blow molding (ISBM) process—the one most frequently used in practice—the material viscosity typically drops between 0.01 and 0.09 dL/g, wherein the copolymer fraction remains substantially the same. Investigations have shown that the copolymer fraction can rise slightly, since non-typical packages with higher copolymer are also part of the recycling stream and cannot be easily sorted out. In addition, reactions occur in which more diethylene glycol (DEG) is formed, and more DEG is incorporated into the polymer chain.

In contrast to the injection stretch blow molding process used most frequently for the production of PET bottles, however, viscosities of between 0.5 and 0.7 dL/g are required for thin-wall injection-molding. This means that the material obtained in the standard PET recycling process, and common materials reclaimed therefrom, cannot be used for the injection-molding process.

According to recent legislation, the European packaging industry is required to use up to 35% recycled material in newly-manufactured PET articles. This legal requirement relates to both the ISBM method and the injection-molding method. In principle, it would be desirable if the articles produced by injection-molding, the materials of which have a low viscosity, could be collected separately, so that the recovered material could be used again for the production of injection-molded articles. Unfortunately, this is not yet possible, however, for economic reasons, since the economy of scale with very low quantities does not allow this separate collection and recycling stream.

In the standard PET recycling stream, however, the low-viscosity injection-molded articles, which are generally available only in small quantities, are not a problem, since the chain lengths are mutually compensating due to the cross-esterification occurring in the melt.

PET for blow molding processes, with a viscosity of 0.72 to 1.4 dL/g according to ASTM D4603, is much too hard and viscous to allow molding of complicated, thin-walled articles. In a situation where one wants to mold injection-molded articles at a customary pressure of up to 3,000 bar, for a ratio of wall thickness (L) to flow path (D) that is customary for injection-molding (1 to 100 to 1 to 350 (thin-wall injection-molding up to 1 to 500), no standard PET can be used, because large areas of the die could then not be filled.

PET materials, as new goods, with a viscosity of 0.5 to 0.7 dL/g (ASTM D4603), designed precisely for these applications, are known. However, there is no separate recycling stream precisely for these polyester types. Packaging manufacturers who wish to use precisely this material, will nevertheless have to demonstrate a recycled material fraction of 25% to 50% in the future, depending upon which statutory regulation or voluntary commitments are binding for the producer starting in 2025 or 2030. However, a much higher recycled material fraction of 40 to 100% is usually required for polyester applications.

A PET recycling material with a viscosity of 0.5 to 0.7 dL/g is required for packaging produced by injection-molding. This seems very simple at first glance; after all, PET can be brought down to the planned viscosity very easily using water and heat.

If 100 to 1,000 ppm water is added to the commercially available PET recycling material for PET injection-molding, the PET decomposes precisely as planned to a viscosity of 0.5 to 0.7 dL/g, however, the material is, due to this decomposition (hydrolysis), cloudy-white and partially crystalline. Bubbles also arise to a certain degree. The uncontrolled crystallization gives rise to depressions, cavities, and highly stretched parts which, due to the low viscosity and high inherent stress, are also much too brittle for the final application as packaging.

The commercially available PET main recycling stream consists largely of PET bottles produced from a material having a viscosity of about 0.72 to 0.86 dL/g in an injection stretch blow molding process (ISBM process). This recycling stream has too-high a viscosity for the injection-molded thin-walled parts. The commercially available recycled goods from the main stream primarily contain PET ISBM bottles with a copolymer fraction of 2 to 3%. This copolymer fraction fluctuates greatly depending upon whether there are many films and deep-drawn articles, PET-G, or multi-use bottles in the recycling goods. In general, the copolymer fraction is too unpredictable to be able to produce stable, thin-walled injection-molded parts from rPET, which must not crystallize in an uncontrolled manner.

Due to other components in the recycling stream, e.g., deep-drawing films, and due to the decomposition of PET during processing, the average viscosity in the recycling goods is less than the starting material by 0.02 to 0.09 dL/g; however, the material must be decontaminated using heat and vacuum (or nitrogen) to be suitable for contact with food. This decontamination can take place in a dryer before the recycling extruder, in the recycling extruder, or after the recycling extruder in a so-called SSP process. Combinations are also frequent.

In the decontamination, not only is the material degassed, but the polyester product inevitably builds up again under these conditions, and the chains become longer.

Even though highly decomposed PET is found on the market, which would be suitable in terms of viscosity, it is not suitable for the production of a thin-walled PET injection-molded packaging as far as composition and contamination are concerned. This is because it has not been decontaminated under vacuum, and, moreover, has crystallized too quickly.

It is known that PET can be decomposed in a targeted manner by the addition of monoethylene glycol (glycolysis). WO001997020886A1 discloses, for example, a method which makes previously used polyester materials available for recycling, with the aid of glycolysis and subsequent cleaning. In this case, recycled PET is contacted at a temperature in the range from 150 to 300° C. for between 10 minutes and 4 hours with 1.1 to 10 moles ethylene glycol per mole of dicarboxylic acid in the polyester, in order to depolymerize the polyester and to produce a reaction mixture which contains monomeric and oligomeric dihydroxy-species. Excess ethylene glycol is then removed, and the reaction mixture is dissolved in a hot solvent. The hot solution is then filtered to remove unwanted impurities. Next, the solution is cooled, and the dihydroxy-species are precipitated as solids.

It is also known that PET is transesterified by the addition of low molecular weight esters or polyesters (cross and trans-esters), and the viscosity under heat is balanced by exchanges of polyester in the chain. For example, a polyester with the monomers A and B and a second polyester with the monomers B and C can form a third copolyester by transesterification which contains monomers of types A, B, and C in its chains. This is known for PET polyesters with isophthalic acid (IPA) and diethylene glycol (DEG), as well as for PET copolyesters with naphthalene dicarboxylic acid (NDC) and furandicarboxylic acid (FDCA).

ADVANTAGES OF THE INVENTION

The present invention provides an rPET material which is suitable, in particular, for thin-wall injection-molding and originates primarily from rPET which is obtained from the collection of post-consumer PET articles, and in particular blow-molded PET bottles. An rPET material is provided that can be injection molded at 500 to 3,000 bar, and, ideally, approx. 1,000 bar, at a ratio of wall thickness to flow path that is customary for injection-molding of 1 to 100 to 1 to 350, or to 1 to 500 for thin-wall injection-molding. In particular, the proposed material crystallizes only slowly. The material can be processed in such a way that it remains transparent, i.e., substantially glass-clear, and no crystallization of the material scatters the light in such a way that the content is no longer visible.

Definitions

In the context of the present invention, the term, "viscosity," is understood to mean the intrinsic viscosity (IV) measured according to the ASTM 4603-03 standard.

In the context of the present invention, "correctly sorted PET" is understood to mean that PET has been sorted within the scope of today's technological possibilities so that the weight-based proportion of non-sorted plastic is less than 2%, less than 1%, or more advantageously less than 0.5%.

"rPET" is used in the present case as a short designation for recycled post-consumer PET.

"Bottle grade PET post-consumer recycling flake" is rPET processed to form flakes, which originates from the collection of post-consumer PET articles, and in particular PET bottles.

In the context of the present invention, ISBM PET is understood to mean PET (including PET copolymers) which is suitable for use in an ISBM process, i.e., has an IV between 0.72 dL/g and 0.86 dL/g (viscosity measurement according to ASTM D4603).

In the context of the present invention, "chain breaker" is understood to mean a chemical compound which is suitable for decomposing PET or being incorporated as a copolymer into the polymer chain.

SUMMARY OF THE INVENTION

The invention relates to a method for producing an rPET plastic material for use in a thin-wall injection-molding process, with a ratio of wall thickness (L) to flow path (D) of 1 to 100 to 1 to 350, comprising the method steps of a) sorting, washing, and comminuting post-consumer PET articles—mostly PET bottles produced by an ISBM process—the PET material of which has an intrinsic viscosity between 0.72 and 0.86 dL/g according to ASTM D4603,
b) removing impurities such as metal or paper before, simultaneously with, or after method step a),
c) subsequently drying the comminuted PET material,
d) melting the comminuted and dried PET material and optionally decontaminating it in a degassing and/or recycling extruder, and then granulating it, and
e) producing a thin-walled injection-molded article from the PET material in an injection-molding process.

According to the invention, a method for producing an rPET plastic material for use in a thin-wall injection-molding process, with a ratio of wall thickness (L) to flow path (D) of 1 to 100 to 1 to 350, or to 1 to 500 for thin-wall injection-molding, in which method a) post-consumer PET articles—mostly PET bottles produced by an ISBM process—the PET material of which has an intrinsic viscosity between 0.72 and 0.86 dL/g according to ASTM D4603, are sorted, washed, and comminuted,
b) impurities such as metal or paper are removed before, simultaneously with, or after method step a),
c) the comminuted PET material is subsequently dried,
d) the comminuted and dried PET material is subsequently melted and decontaminated in a degassing and/or recycling extruder, and then granulated,
e) a thin-walled injection-molded article is produced from the PET material in an injection-molding process, and a chain breaker added to the granulated material, and the melt of the granulate and chain breaker reactively extruded and injected directly into an injection mold, wherein the process is carried out in such a manner that the intrinsic viscosity of the injection-molded article is lowered to 0.5 to 0.7 dL/g during the extrusion, or more advantageously to 0.5 to 0.65 dL/g, and a thin-walled injection-molded article which has a ratio of wall thickness (L) of the injection-molded article to the flow path (D) of 1 to 100 to 1 to 350, or to 1 to 500 for thin-wall injection-molding, that can be produced in an injection-molding process. This method has the advantage that rPET from a conventional PET recycling stream, and in particular from blow-molded PET bottles, can also be used for the production of thin-walled injection-molded articles.

Advantageously, the temperature during extrusion, the residence time of the material in the extruder, and the amount of chain breaker are selected such that the extruded material has an intrinsic viscosity (IV) greater than 0.5 dL/g, in particular between 0.52 and 0.68 dL/g, and ideally between 0.55 and 0.65 dL/g. Such material can be easily made into thin-walled, strip-free articles.

A PET bottle stream may be used, which contains particularly few impurities of polymers other than PET (for example, PA blends). In the context of the present invention, "particularly few" is understood to mean that the proportion of PA blends, radical scavengers, and other additives such as, for example, oxygen scavengers, acetaldehyde scavengers, UV absorbers, slip additives, infrared absorbers, etc., is less than 10 wt %, less than 5 wt %, or more advantageously less than 3 wt %.

According to one method variant, either a certain amount of monoethylene glycol or a certain amount of water is used as a chain breaker. With the aid of monoethylene glycol or water, the IV can be lowered by cleaving the PET molecules directly during the actual injection-molding process to the extent that thin-walled articles can be produced.

PET recycling material may be used for the extrusion has a water content between 100 and 1,000 ppm or more advantageously between 300 and 1,000 ppm water. This means that the previous drying and decontamination may be carried out such that the desired water content arises. Alternatively, the PET recycling material can also be enriched again with water after the drying and/or decontamination (method steps c) and/or d)).

Instead of water, between 50 and 1,000 ppm monoethylene glycol can also be added and/or metered to the granulated material. This likewise leads to the desired lowering of the intrinsic viscosity during the injection-molding process.

According to another method variant, compounds which can be incorporated into the PET polymer molecules and thus lead to a higher copolymer fraction are used as chain breakers. Surprisingly, by increasing the copolymer fraction, the intrinsic viscosity can be reduced, and the crystallization speed can be slowed down to such an extent that thin-walled, transparent, and strip-free articles can be injection molded. This effect was unexpected, since it had to be assumed that a clouding of the material would take place. Furthermore, it had been expected that bubbles and small cracks would form in the injection-molded article, similar to when water is used for the decomposition of the rPET. As a result of the addition of suitable chain breakers and their incorporation into the PET polymer chains, the proportion of copolymers during the extrusion can be raised by at least 1%, at least 2% or more advantageously at least 3%, as desired, and the viscosity of the material can be reduced. The proposed method makes use of the effect that higher copolymer fractions change the PET molecular chain such that crystallization is inhibited or suppressed as a result.

Monoethylene glycol is a known chain breaker. Monoethylene glycol, however, is already part of the PET chain. As a result of the addition of monoethylene glycol, the chain is cleaved, but the copolymer fraction is not increased.

It is advantageous to use diols, which can be incorporated as copolymer into the chain, as chain breakers. Diols may include diethylene glycol, propylene glycol, and/or butylene glycol, as well as cyclic polyalcohols such as 3,9-bis(1,1-dimethyl-2-hydroxyethyl)-2,4,8,10-tetraoxaspiro[5.5]undecane (spirolglycol).

According to another method variant, dicarboxylic acids are used as chain breakers. These are likewise very suitable for reducing the chain lengths.

Dicarboxylic acids as chain breakers include isophthalic acid, 2,5-furandicarboxylic acid, and/or naphthalene dicarboxylic acid, since these can be incorporated as copolymer into the polymer chain.

According to an advantageous method variant, diesters are used as chain breakers. Suitable diesters are, for example, dimethyl isophthalate and/or bis(hydroxyethyl) isophthalate.

The diols, dicarboxylic acids, and diesters can each be used individually or as mixtures.

Advantageously, PET copolymer chains with 2 to 20 monomers with an isophthalic acid (IPA), furandicarboxylic acid (FDCA), naphthalene dicarboxylic acid, or diethylene glycol fraction are used as chain breakers.

The isophthalic acid (IPA), furandicarboxylic acid (FDCA), naphthalene dicarboxylic acid, or diethylene glycol fraction is, expediently, between 3 and 10 wt %.

It is also conceivable to use compounds which have an alcohol group and a dicarboxylic acid or an ester group as chain breakers. Examples of such compounds are hydroxyethanoic acid (hydroxyacetic acid), hydroxypropanoic acid, and hydroxybutanoic acid.

It is also conceivable to use caffeine as a chain breaker. Caffeine is the trivial name for 1,3,7-trimethyl-2,6-purinedione (short form: 1,3,7-trimethylxanthine).

Advantageously, the chain breaker is added in method step f) before or during the melting of the granulate.

Advantageously, the post-consumer PET material used has a copolymer fraction of not more than about 3% or more particularly a copolymer fraction of at most 2.5% before the drying and recycling in method step d).

The method step f) may be carried out in such a manner that the copolymer fraction in the rPET, in total, is raised to 2.5 to 8%, advantageously to 3.0 to 8%, or more advantageously to 3.5% to 8%. An increased copolymer fraction leads to a reduction in the IV and at the same time a slowing of the crystallization rate, which makes the injection-molding of thin-walled articles possible.

Advantageously, a decontamination of the post-consumer input goods is carried out by degassing the volatile contaminants at elevated temperature between 70 and 330° C., or more advantageously between 180 and 220° C., before the recycling extruder, i.e., method step d), and/or in the recycling extruder and/or after the recycling extruder, with a vacuum of less than 0.2 bar absolute, and/or with nitrogen flushing between 0.1 sec and 20 hours, or more advantageously 4 to 10 hours.

After extrusion in the recycling extruder, the granulate can optionally be degassed in an SSP reactor at a temperature of 180 to 220° C. for 1 to 15 hours, or more advantageously 4 to 10 hours, at negative pressure. A polymerization (polycondensation) takes place simultaneously.

The decontamination under heat and vacuum can take place in the extruder and in the subsequent SSP reactor. Of course, nitrogen can also be used instead of vacuum to remove contamination. Heat and vacuum or a protective gas atmosphere (e.g., nitrogen) can in principle already be used in the material treatment before the recycling extruder.

The material may be decontaminated by subsequent treatment in the SSP reactor, but the viscosity thereof is not raised high enough to make a PET which is well suited for the stretch blow molding process; rather, it leaves the SSP at a viscosity of <0.72 dL/g.

Prior to the actual injection-molding method step f), the material may be decontaminated to such an extent that it is suitable for applications in the food and/or utensils sector.

A master batch of the chain breaker is, advantageously, produced, and this master batch is metered directly into the inlet of the injection-molding machine. This has the advantage that the proportion of chain breakers can be controlled very well, and good mixing takes place in the extruder.

The comminuted PET recycling material may be dried after the washing process at temperatures between 60 and 180° C. for 1 to 8 hours.

The reactive extrusion in method step f) advantageously reduces the intrinsic viscosity of the material used by 0.05 to 0.3 dL/g, or more advantageously 0.1 to 0.25 dL/g.

Advantageously, the crystallization fraction of the treated rPET injection part is reduced by at least 10% compared to the untreated material without an increased copolymer fraction.

According to a another method variant, the temperature during extrusion and the amount of chain breaker are selected such that the extruded material has an IV greater than 0.5 dL/g and in particular between 0.5 and 0.7 dL/g.

Advantageously, between 0.05 wt % and 2.8 wt %, between 0.1 wt % and 1.0 wt %, or more advantageously between 0.1 wt % and 0.6 wt % of chain breaker is added to the PET of method step f).

The residence time of the polyester material in the injection-molding unit or recycling extruder is advantageously in each case between 20 and 400 sec, between 30 and 300 sec, or more advantageously between 40 and 200 sec. With the aforementioned residence times, the IV of the polyester material can be lowered by 0.05 to 0.3 dL/g in the presence of a chain breaker during extrusion.

According to a further embodiment of the invention, the extruded melt is filtered before the granulation.

According to a further embodiment of the invention, the extruded melt is pressed through a hole filter having a hole size between 30 μm and 300 μm, or more advantageously between approximately 50 μm and 100 μm. As a result, the melt has sufficient purity, and turbidities and impurities are prevented in the injection-molded end product.

According to a further embodiment of the invention, the rPET material is degassed and decontaminated during the extrusion in method step d).

According to a further variant, the melt is divided into thin layers or strands in the extruder. As a result, the surface of the material is enlarged, and the decontamination can be carried out very quickly.

According to a further embodiment of the invention, the extrusion takes place in vacuum or in a protective gas atmosphere, and in particular under nitrogen.

In a further embodiment of the method, it is an alternative form of injection-molding or a mixed form of injection-molding in the sense of compression molding.

In a further embodiment of the method, it is an alternative form of injection-molding and/or a mixed form of injection-molding in the sense of injection foaming.

DETAILED DESCRIPTION OF THE INVENTION

For the method, post-consumer PET material having a viscosity between about 0.7 and about 0.86 dL/g is used. A PET bottle stream may be used which contains particularly few impurities of polymers other than PET (for example, PA blends). In the context of the present invention, "particularly few" is understood to mean that the proportion of PA blends, radical scavengers, and other additives such as, for example, oxygen scavengers, acetaldehyde scavengers, UV absorbers, slip additives, infrared absorbers, etc., is less than 10 wt %, less than 5 wt %, or more advantageously less than 3 wt %.

In a first process step, post-consumer PET bottles are sorted into a single type, washed, and cut, and impurities such as metal, paper, etc., are removed. During sorting, the collected PET material is initially sorted for color, and then foreign plastics may be sorted out.

In a second process step, the cut PET flakes are dried.

In a third process step, the rPET is decontaminated and granulated in a degassing or recycling extruder.

In a fourth process step, a chain breaker is added to the granulate, and a reactive extrusion of the granulate is then carried out. Under these conditions, the rPET rapidly decomposes during extrusion in the injection unit, i.e., the average molecular weight of the rPET and thus the intrinsic viscosity decreases.

The addition of the chain breaker is predominantly envisaged in the injection-molding unit, but can alternatively be added in rare cases or complementarily in the recycling extruder. As a result of the addition of chain breaker not only in the extruder of the injection-molding machine, but also in the extruder of the recycling machine, the recycling material can be deliberately decomposed and enriched with copolymers in the extrusion process.

EXEMPLARY EMBODIMENTS

Example 1

Ground material of post-consumer PET bottles with an average IV of 0.72 dL/g and an average copolymer fraction of 1% isophthalic acid and 1.3% diethylene glycol are admixed with 0.5% diethylene glycol in a recycling extruder and extruded at 290° C. on average. Surprisingly, the viscosity after the recycling extruder was reduced much more than usual to a value of only 0.58 dL/g. After a subsequent SSP (6 h at 220° C., to achieve food contact compliance), the granulate had built up only to 0.72 dL/g. This granulate is dried to below 50 ppm water content and added to an injection-molding machine together with a second quantity of diethylene glycol (0.2%). Surprisingly, the PET could again drop to a viscosity of only 0.55 dL/g, and a preform could be injection molded with only 1 mm wall thickness and a flow path of 120 mm.

Example 2

Material of post-consumer bottles is decomposed in a conventional recycling process to form granulate for an injection stretch blow molding process, with a viscosity in an SSP of 0.76 dL/g. However, the dried granulate (180° C.-6 h, dried air, 2 $m^2$ air/kg PET, dew point −35° C.) is fed to an injection-molding machine and admixed with 2% diethylene glycol. In the melt, the diethylene glycol brought the PET down to a viscosity of 0.61 dL/g, and, surprisingly, it was possible to mold a preform with only 1 mm wall thickness and 120 mm flow path.

The invention provides a method by which previously used polyester materials, including either production waste polyester materials and/or used polyester materials, can be recovered and purified conveniently and efficiently. In the process, the collected PET material is initially sorted for color, may then sorted again, cut into small pieces (milled), washed, dried, extruded, and may at the same time be decontaminated, granulated, and optionally polymerized and again decontaminated, and then extruded into a thin-walled article in the presence of chain breakers.

The invention relates to a method in which a recycled post-consumer PET having a viscosity of between 0.72 and 0.86 dL/g according to ASTM D4603 and a copolymer fraction of not more than about 3 wt % is used to produce, with the aid of a chain breaker, a starting material for injection-molding having a viscosity between 0.50 and 0.7 dL/g. In the method, the comminuted and dried PET material is melted and decontaminated sufficiently that it is suitable for applications in the food and utensils sector. A chain breaker is added to the rPET material in the melt of the recycling extruder and/or the melt of the injection unit in order to lower the viscosity and to enrich the PET with copolymers.

The invention claimed is:

1. A method for producing an rPET plastic material for use in a thin-wall injection-molding process, with a ratio of wall thickness (L) to flow path (D) of 1:100 to 1:500 for thin-wall injection-molding, the method comprising:

sorting, washing and comminuting post-consumer PET articles comprised mostly of PET bottles produced by an ISBM process, PET material of which has an intrinsic viscosity between 0.72 and 0.86 dL/g according to ASTM D4603, removing impurities before, simultaneously with, or after the sorting, washing and comminuting, drying the comminuted PET material, melting and optionally decontaminating the PET material in a degassing and/or recycling extruder, and then granulating the PET material, and producing a thin-walled injection-molded article from the PET material in an injection-molding process, and adding a chain breaker compound to the granulated PET material, and reactively extruding and directly injecting a melt of the PET material into an injection mold, wherein the chain breaker compound can be incorporated into PET polymer molecules of the PET material and thus lead to a higher copolymer fraction;

wherein an intrinsic viscosity of a thin-walled injection-molded article formed from the PET material is lowered to 0.5 to 0.7 dL/g during extrusion and has a ratio of wall thickness (L) of the resulting thin-walled injection-molded article to a flow path (D) of 1 to 100 to 1 to 350.

2. The method according to claim 1, wherein a temperature during the reactive extrusion after granulating the PET material, a residence time of the material in the extruder, and an amount of the chain breaker are selected such that the extruded PET material has an intrinsic viscosity (IV) greater than 0.5 dL/g.

3. The method according to claim 1, wherein an amount of monoethylene glycol or an amount of water is used as the chain breaker.

4. The method according to claim 1, wherein the PET material used for the reactive extrusion after granulating the PET material, contains 100 to 1,000 ppm water.

5. The method according to claim 1, further comprising adding between 50 and 1,000 ppm of monoethylene glycol to the granulated PET material.

6. The method according to claim 1, wherein the copolymer fraction is raised by at least 1% compared to the starting PET material.

7. The method according to claim 1, wherein diols are used as the chain breaker.

8. The method according to claim 7, wherein diethylene glycol, propylene glycol, butylene glycol, and/or cyclic polyalcohols are used as diols.

9. The method according to claim 1, wherein dicarboxylic acids are used as the chain breaker.

10. The method according to claim 9, wherein isophthalic acid, 2,5-furandicarboxylic acid, and/or naphthalene dicarboxylic acid is used as the dicarboxylic acid.

11. The method according to claim 1, wherein diesters are used as the chain breaker.

12. The method according to claim 11, wherein dimethylisophthalate and/or bis(hydroxyethyl) isophthalate are used as the diester.

13. The method according to claim 1, wherein PET copolymer chains with 2 to 20 monomers, with an isophthalic acid (IPA), furandicarboxylic acid (FDCA), naphthalene dicarboxylic acid, or diethylene glycol fraction, are used as the chain breakers.

14. The method according to claim 13, wherein a fraction of isophthalic acid (IPA), furandicarboxylic acid (FDCA), naphthalene dicarboxylic acid, or diethylene glycol is between 3 and 10 wt %.

15. The method according to claim 1, characterized in that compounds which have an alcohol group and a dicarboxylic acid or an ester group are used as the chain breakers.

16. The method according to claim 1, wherein caffeine is used as the chain breaker.

17. The method according to claim 1, wherein an admixture of the chain breaker is added to the PET material before or during the melting.

18. The method according to claim 1, wherein the post-consumer PET material used, before the drying and recycling, has a copolymer fraction of not more than about 3%.

19. The method according to claim 1, the adding the chain breaker is carried out in such a manner that the copolymer fraction in the rPET, in total, is raised to 2.5 to 8%.

20. The method according to claim 1, further comprising decontaminating the post-consumer input goods by degassing volatile contaminants at elevated temperature between 70 and 330° C. before the recycling extruder and/or in the recycling extruder and/or after the recycling extruder, with a vacuum of less than 0.2 bar absolute, and/or with nitrogen flushing between 0.1 sec and 20 hours.

21. The method according to claim 1, wherein the PET material is decontaminated to such an extent before the injection-molding so that it is suitable for applications in the food and/or utensils sector.

22. The method of claim 1, further comprising producing a master batch using the granulated PET material and a chain breaker, and metering the master batch directly into an inlet of an injection-molding machine.

23. The method according to claim 1, wherein the comminuted and dried PET material is dried at temperatures between 60 and 180° C. for 1 to 8 hours.

24. The method according to claim 1, wherein the reactive extrusion after granulating the PET material reduces a viscosity of the PET material by 0.05 to 0.3 dL/g.

25. The method according to claim 1, wherein a crystallization fraction of a treated rPET injection-molded part is reduced by at least 10% compared to an untreated material without an increased copolymer fraction.

26. The method according to claim 1, wherein a temperature during the reactive extrusion after granulating the PET material and a quantity of chain breaker are selected such that an extruded PET material and/or the PET material of an injection-molded article produced has an IV greater than 0.5 dL/g.

27. The method according to claim 1, wherein between 0.05 wt % and 2.8 wt % of chain breaker is added to the granulated PET material.

28. The method according to claim 1, wherein the melt of the PET material is filtered before being granulated.

29. The method according to claim 28, wherein the melt of the PET material is pressed through a hole filter having a hole size between 30 μm and 300 μm.

30. The method according to claim 1, wherein the PET material is degassed during extrusion.

31. The method according to claim 1, the melt of the PET material is divided into thin layers or strands during the reactive extrusion after granulating the PET material.

32. The method according to claim 1, wherein the reactive extrusion after granulating the PET material is carried out in a vacuum or in a protective gas atmosphere.

33. The method according to claim 1, wherein a certain amount of chain breaker is added to the PET material prior to melting.

34. The method according to claim 1, wherein a residence time of the PET material in an injection-molding unit or recycling extruder is in each case between 20 and 400 sec.

35. The method according to claim 1, wherein the post-consumer PET material has a viscosity between about 0.7 and about 0.86 dL/g.

36. The method according to claim 1, wherein the PET material is subjected to an alternative form of injection-molding and/or a mixed form of injection-molding comprising compression molding or injection foaming.

* * * * *